May 21, 1935.  W. E. SIGNOR  2,002,331

SIGNAL LENS MEANS

Filed Aug. 10, 1933

WILLIAM E. SIGNOR INVENTOR

BY Louis Illmer

ATTORNEY

Patented May 21, 1935

2,002,331

UNITED STATES PATENT OFFICE 2,002,331

SIGNAL LENS MEANS

William E. Signor, Gettysburg, Pa., assignor, by mesne assignments, to Seco Manufacturing Company, Gettysburg, Pa., a corporation of Pennsylvania Application August 10, 1933, Serial No. 684,488

9 Claims. (Cl. 177—329)

My invention relates to the art of display signals, and more particularly pertains to a novel unitary lens or translucent plate of the partially blinded type that is especially adapted for flash signal purposes of the wigwag kind such as has been more fully disclosed in my copending application, Serial No. 646,502 filed December 9, 1932 and which devices, the present appurtenances are intended to simplify and to otherwise reduce the manufacturing cost thereof.

One exemplification of the above identified signal means comprises a chambered casing having an open mouth that is closed by a removable cover and which includes the use of a sheet metal web plate that is perforated to allow of separately installing a series of dished transparencies or multiple flash lenses therein. The signal in question is characterized by a movable electric light which may be made to swing into successive registry with the respective lenses and thus set up an attractive display effect or warning signal that is especially suited to motor vehicle and animated sign purposes.

The primary object of the present invention is to refine certain structural details of the aforesaid signal means, particularly as directed to a unitary cover member that may be moulded in one piece to provide for a plurality of dished lenses and of which member, one face is herein treated with an appropriate mirroring substance to render certain localized regions impervious to light rays, the disposition being such as to reflectively brighten up and intensively illumine the outermost exposed signal face when the flash bulb is operatively lighted or any oncoming headlight and the like extraneous rays should happen to fall thereon. In addition, my beehive lenses have been equipt with improved prismatic means designed to simulate a novel whirling light effect that is of significance as applied to the present flash light instrumentalities.

The problem herein solved is of commercial importance in that my one-piece casing cover allows of incorporating numerous dished lenses therethrough in close side by side or abreast formation; that is to say, the elimination of individual lens frames, makes it possible to more compactly crowd a course of flash lenses of a given diametral size into smaller space in comparison with conventional practice as detailed in my prior Patent #1,751,018 of March 18, 1930.

Reference is had to the accompanying one sheet of drawing which is illustrative of a specific embodiment of my invention, and in which:

Fig. 3 shows a sectional view taken along line 3—3 while

Figure 2:
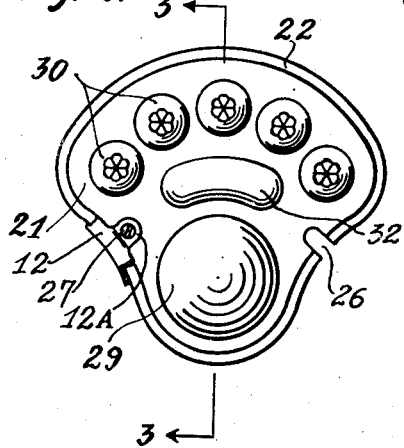
Fig. 2 is a front elevational view of my one piece lens.
Figure 1:
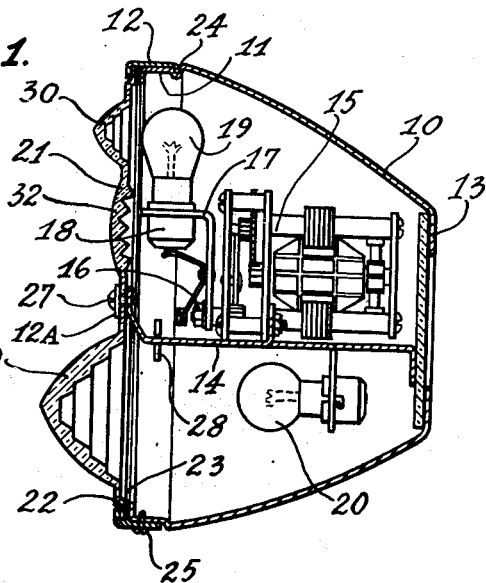
Fig. 1 represents a vertical sectional view of an assembled signal device that corresponds with Fig. 2 of the foresaid copending application.

Referring in detail to the drawing, 10 denotes a tubular sheet metal casing or housing whose open mouth may be given a sectorlike contour and of which the marginal region is preferably inset at 11 to embracingly receive a cross-sectionally angleshaped rim 12 therearound. Said casing may be given any suitable chambered shape such as a warped parabolic frustrum of which the contracted end is here made to terminate in an inturned rear flange 13.

The casing interior may be partitioned into compartments by the use of the deck plate 14 that is removably mounted for withdrawal in unison with said lens in breechlike fashion. Superimposed upon said plate is a drive motor 15 which may include a rockshaft or other oscillatory axle 16. The overhung forward shaft end mounts an angularly disposed wigwag arm 17 thereon of which the outstanding leg is shown provided with an electric lamp socket 18 mounting a flash light bulb 19 therein and arranged to swing closely behind a series of spaced transparencies or lenses presently to be described in detail.

In the lowermost casing compartment, a tail light bulb 20 is disposed beneath the deck plate. The required wiring connections (not shown) are intended the comprise suitable contact clips and switches so that the motor may at will, be made to impart an oscillatory movement to the then lighted flash light bulb 19 while the tail light bulb 20 may be independently thrown into service.

Figure 3:
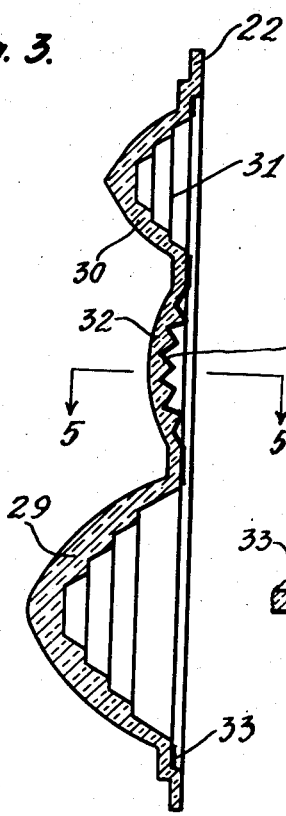
Figure 4:
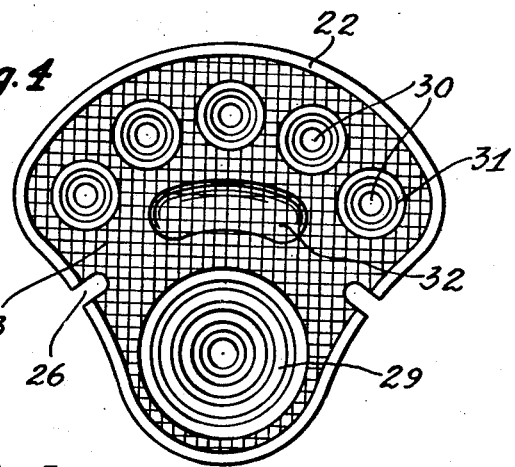
Fig. 4 depicts a rear view thereof.

The present improvements are more largely centered in the use of a one piece, substantially flat and partially blinded cover member 21 which as detailed in Figs. 2 to 4, may be fabricated from clear or ruby colored glass, translucent ceramic or the like plastic material. Such material is preferably moulded to constitute an offset, marginal flange 22 adapted to be gripped in bezel fashion behind the rim 12, there being a cork or the like gasket 23 interposed to cushion the flange mounting. All medial portions of my one-piece ceramic casting are kept inset laterally with respect to the gasket contacting side of such flat marginal flange, which in turn facilitates the smooth facing of said flange to make a snug weatherproof fit capable of tightly sealing the casing mouth.

For securement purposes, the rim equipt with a clip 24 and retained in place by the oppositely disposed fastener 25. The demountable cover member 21 may have the flanged perimeter thereof slotted radially inward as shown at 26 and which unobstructed indentation is preferably cast into the glass lens. The innermost marginal edge of my annular rim may be equipt with an apertured lip extension 12A that is overlappingly disposed to conceal its inset lens slot 26 therebehind in the fashion fragmentally shown in Fig. 2. The fastening screw 27 is entered through the lip aperture and the flange indentation.

As a casting, my unitary cover may be given any suitable marginal configuration or cross-sectional profile. As shown, this preferably comprises a hollow inbuilt tail light lens 29 having a concavo-convex or the like substantially conical profile characteristic of the so-called beehive type. Disposed therearound in abreast relationship, are a series of flash light lenses such as 30 that are perimetrically set apart and of which the respective crowns overhangingly protrude forwardly beyond one side surface of my platelike signal member. The interior or the exterior surface of any such bee hive lenses or transparencies may be corrugated in the stepped prismatic manner indicated at 31 or they may be otherwise shaped to provide for an equivalent catadioptric formation serving to bring about a simulated light whirl when flashed by the swingable bulb 19.

Each of the multiple lenses 30 is preferably given the cross-sectional profile that is detailed in Fig. 3 to include several concentric ledgelike prisms of different diametral sizes and which ledge elements may be progressively disposed at increasing distances away from the focal point of the cooperating flash lamp. I have found that when said lamp is regularly swung lengthwise of such catadioptric steps 31, some light will flash therethrough while another portion will by simultaneous reflective action, set up an optical illusion as seen when looking toward the exterior cover face; that is to say, the reflected light rays appear to be given a twist around the lens axis when the lamp travels in one direction and which simulated twist is reversed when the lamp travels in the opposite direction.

Figure 5:
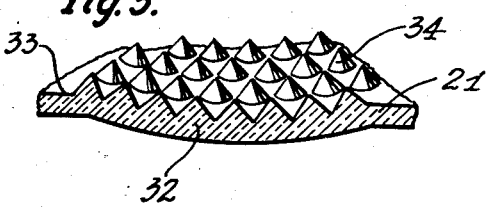
Fig. 5 is a fragmental detail as taken centrally along the section line 5—5 of Fig. 3.

As a decorative reenforcing feature, substantially the whole face of the cover plate or a localized portion thereof may be shaped to provide for a cross-sectionally arched or other laterally stiffened region 32, which if desired, may be cast to carry a suitable inscription thereon. As shown in Fig. 5, the concave interior surface of said region may be studded with a plurality of staggered spines 34 or the like checker-work formation adapted to augment the reflective capacity of the outermost convex surface of such region.

As a further refinement, certain portions of the irregular rear face of my moulded plate 21 are preferably blinded at 33 radially about the base regions of my dished transparencies, by the use of a localized coating or opaque backing plate of highly reflective substance whose location is indicated in Figs. 3 and 5 and its superficial area is schematically represented by crosshatching in Fig. 4, it being the intent to leave the several transparencies 29 and 30 uncovered and thus allow the bulb light to be unrestrictedly transmitted therethrough. The mirroring surface is faced forwardly and disposed to turn back any extraneous light rays that may be focused upon the exposed outermost surface of my moulded cover plate.

It will be noted that the respective lens steps such as 31 are generated about a common axis which circular formation readily allows my smoothly surfaced lens pocket to be wiped clean. A further characteristic of said one piece cover lies in the use of a relatively large dished tail light lens 29 about which a plurality of similar flashable lenses 30 are disposed, the latter having their respective basal regions set radially away from that of the tail light lens to an extent that will provide for an adequate interposed mirroring surface therebetween that is kept substantially equal to the projected surface embraced within the base contour of the tail light lens.

It is believed the foregoing structural disclosure of my unitary signal member will suffice to make apparent the intended function and its mode of operation. The integrally formed cover elements materially simplify the fabrication and assembly work over the conventionally built up type of wigwag lens plate; the present innovation also affords an additional outstanding safety advantage in that the cited mirroring means serve to duly warn any oncoming motorist against possible collision with a leading car, even when for any reason both the tail light and the flash light bulbs of my device should fail to function in a normal manner.

When kept in proper working order, the described prismatic lenses 30 are adapted to intensify the flash effect by imparting the striking simulated whirl thereto that was previously described. The respective protruding crown portion of my beehive flash lenses, when flashed, are disposed to cooperatively illumine the aforesaid reflective plate region and thus cause the entire crosshatched surface region 33 to become brilliantly lighted whenever it is desired to attract attention thereto. My signal may be disposed at either the front or rear of a motor vehicle and because of its neat trim, serves to beautify the appearance of any car upon which it may be installed.

It is to be understood that various changes in the structural details and arrangement of the described signal appurtenances may be resorted to so as to adapt the same to certain of the alternative exemplifications disclosed in my copending application or the like, all without departing from the spirit or scope of my invention as herein described and more particularly pointed out in the appended claims.

I claim:

1. In a flash signal, the combination of a one-piece, translucent platelike member provided with a series of flashable lenses disposed in abreast formation and having their respective lens perimeters set apart, all of said lenses being integrally inbuilt with said member and the respective cross-sectional lens profiles being corrugated to impart a catadioptric surface to the respective lenses, means rendering one face of said platelike member opaque between the respective lens perimeters thereof, movable flash lamp means, and means for moving said lamp means into successive cooperative registration with the aforesaid lens series.

2. A one-piece signal member shaped from relatively transparent material to comprise a plurality of inbuilt flashable lenses disposed in abreast relationship, each such lens having a cross-sectionally dished profile of which one such dished surface is given a prismatic formation, the perimeters of the respective basal regions being set apart and the respective lens crowns protruding outwardly beyond their basal regions in a common direction, and means rendering said member opaque between the respective set apart basal regions of the lens perimeters.

3. A one-piece signal member shaped from relatively transparent material to comprise a plurality of inbuilt lenses that are disposed in abreast relation and have their respective lens perimeters set apart, each such lens having a hollow substantially conical cross-sectional profile of which one lens surface is given a stepped prismatic formation, movable lamp means, and means for moving said lamp means into successive cooperative registration with the aforesaid lenses and their respective prismatic formations to simulate a whirling light effect.

4. A signal member comprising a plurality of flashable lenses arranged abreast with their respective perimeters set apart and having interposed opaque spacings therebetween, each such lens being given a hollow substantially conical cross-sectional profile of which one lens surface is prismatically corrugated in stepped formation, movable flash lamp means, and means moving said lamp means into successive cooperative registration with the aforesaid lenses and their respective prismatic corrugations to produce a combined flash and simulated light whirling effect.

5. A signal comprising chambered casing means having an open mouth region, a unitary cover member serving as a mouth closure, said cover member being provided with a circumscribing flat marginal flange and having a plurality of cross-sectionally dished flash transparencies inbuilt in abreast relation within the flange confines and which transparencies together with all of the remaining cover portions embraced within said flange confines are laterally inset with respect to one side face of said flange, and rimlike retaining means cooperatively engaging said flange and the casing means.

6. A signal comprising chambered casing means having an open mouth region, a unitary cover member serving as a mouth closure, said member being provided with a flat marginal flange and having a course of inbuilt spherical flash lenses disposed in abreast relation within the flange confines, an inbuilt supplementary spherical lens disposed in a perimetrically offset relation with respect to the aforesaid lens course, and a cross-sectionally arched stiffening region interposed between said lens course and the supplementary lens.

7. In a signal device, a platelike member shaped from relatively transparent material to comprise a series of lenses disposed in abreast formation with their respective lens perimeters set apart, each such lens being given a concavo-convex cross-sectional profile of which the respective crown portions project laterally beyond one sideface of said platelike member, means rendering said sideface reflective in its circumscribing region lying exteriorly of the respective lens perimeters, movable flash lamp means, and means for moving said lamp into successive cooperative registration with the aforesaid lenses.

8. An article of manufacture comprising a one-piece platelike signal member shaped from translucent material to include a cross-sectionally dished tail light lens embracing a relatively large area within the marginal contour thereof and which member has a plurality of similar but relatively smaller flashable lenses inbuilt in abreast formation radially about said tail light lens, said flashable lenses being set away from the tail light lens to provide for an intermediate face whose area is commensurable with that embraced within the contour given to the tail light lens.

9. An article of manufacture comprising a one-piece platelike signal member shaped from translucent material to include a relatively large sized tail light lens having a substantially circular basal contour of which the center region is cross-sectionally dished in the direction axially of said contour, and which member further has a plurality of similar but relatively smaller flashable lenses inbuilt radially about said tail light lens, the several basal regions of the respective flashable lenses being set away from the contour of the tail light lens to provide for an intermediate surface therebetween that is commensurate with the area embraced within the contour of the tail light lens and which surface is provided with means rendering it light reflective.

WILLIAM E. SIGNOR.